United States Patent
Niino et al.

[11] Patent Number: 5,790,684
[45] Date of Patent: Aug. 4, 1998

[54] TRANSMITTING/RECEIVING APPARATUS FOR USE IN TELECOMMUNICATIONS

[75] Inventors: Tatsunobu Niino; Masamichi Yokoi, both of Osaka, Japan

[73] Assignees: Matsushita Electric Industrial Co., Ltd., Ibaraki; Yokoi Plan Co., Ltd., Osaka, both of Japan

[21] Appl. No.: 537,274

[22] Filed: Sep. 29, 1995

[30] Foreign Application Priority Data

Dec. 21, 1994 [JP] Japan .................. 6-317410

[51] Int. Cl.⁶ .................................................. H04R 25/00
[52] U.S. Cl. .......................... 381/68.3; 381/151; 381/174
[58] Field of Search .................. 381/68, 68.3, 68.5, 381/68.6, 151, 174, 113, 191

[56] References Cited

U.S. PATENT DOCUMENTS

| | | | |
|---|---|---|---|
| 4,516,428 | 5/1985 | Konomi | 381/151 |
| 4,652,702 | 3/1987 | Yoshii | 381/68.3 |
| 4,696,045 | 9/1987 | Rosenthal | 381/151 |
| 5,282,253 | 1/1994 | Konomi | 381/151 |

FOREIGN PATENT DOCUMENTS

| | | |
|---|---|---|
| 0107843 | 5/1984 | European Pat. Off. . |
| 107 843 | 5/1984 | European Pat. Off. . |
| 58-014695 | 1/1983 | Japan . |
| 58014695 | 1/1983 | Japan . |
| 94/05231 | 3/1994 | WIPO . |
| 9405231 | 3/1994 | WIPO . |
| 94/10818 | 5/1994 | WIPO . |
| 9410818 | 5/1994 | WIPO . |

*Primary Examiner*—Huyen Le
*Attorney, Agent, or Firm*—Armstrong, Westerman, Hattori, McLeland & Naughton

[57] ABSTRACT

A transmitting/receiving apparatus for use in telecommunications is provided which makes the user hand-free and is free from such inconveniences as difficulty in utterance and howling and crosstalk between an earphone and a microphone, and which includes: a first ear-insertion body serving as an earphone; and a second ear-insertion body provided separately from the first ear-insertion body and serving as a microphone of a bone-conduction type.

3 Claims, 6 Drawing Sheets

TRANSMITTING/RECEIVING APPARATUS FOR USE IN TELECOMMUNICATIONS

BACKGROUND OF THE INVENTION

1. Field of the Invention

The present invention relates to transmitting/receiving apparatus of ear insertion type for use with handy phones, cordless phones, transceivers and the like.

2. Description of Related Arts

When communicating through a communication apparatus such as a handy phone, cordless phone or transceiver, it is desired to freely use hands to write a memorandum, to refer to notes, or to operate a personal computer. To this end, a transmitting/receiving apparatus as shown in FIG. 6 has been proposed which comprises a headphone 27 and a microphone 29 supported by a support bar 28 in front of the user's mouth.

The transmitting/receiving apparatus of FIG. 6 is satisfactory in terms of hand-free usage. However, it is difficult to transmit a clear voice to the communication counterpart when the apparatus is used in a noisy place, for example, in a plant or vehicle, because the microphone 29 of the apparatus catches noise.

To solve this problem, Japanese Unexamined Patent Publication No. 5-199577 (1993), for example, proposes a transmitting/receiving apparatus having an ear-insertion body 30 which incorporates therein an earphone 31 and microphone 32 of a bone-conduction type, as shown in FIG. 7.

The transmitting/receiving apparatus shown in FIG. 7 is advantageous in that it frees the user's hands and in that it can transmit a relatively clear voice because the main body thereof is inserted into the user's external auditory meatus and therefore the microphone 32 thereof does not catch external noise. Further, the microphone 32 catches a voice through bone conduction and, therefore, even a faint voice can satisfactorily be caught by the microphone 32.

However, the earphone 31 and microphone 32 are incorporated in a small main body and, hence, the microphone 32 catches acoustic vibration of the earphone 31. Since electrical problems such as howling and crosstalk occur in the apparatus, the volume of the earphone and the sensitivity of the microphone cannot be increased. Therefore, the apparatus cannot satisfactorily receive nor transmit a clear voice.

To solve this problem, a transmitting/receiving apparatus as shown in FIG. 8 has been developed, in which an earphone 33 and a microphone 34 were separately provided, and the microphone 34 adapted to utilize throat vibration was pressingly attached to the user's throat by means of a supporter 35 wrapped around his neck.

The transmitting/receiving apparatus shown in FIG. 8 is advantageous in that the microphone utilizing throat vibration can efficiently pick up a faint voice, and in that the earphone 33 and microphone 34 separately provided do not cause acoustic interference nor crosstalk. However, since the microphone 34 is pressingly attached to the user's throat by wrapping the supporter 35 around his neck, the user feels pressure on his neck. This hinders easy utterance and gives the user uncomfortable feeling in usage. Further, the microphone 34 catches a sound generated when the microphone 34 moves out of position or noise resulting from the rustling of user's clothes. In addition, the apparatus is in a poor appearance.

SUMMARY OF THE INVENTION

It is, therefore, an object of the present invention to provide a transmitting/receiving apparatus for use in telecommunications which is free from howling and crosstalk, and provides a hand-free and comfortable usage.

To achieve the foregoing object of the present invention, there is provided a transmitting/receiving apparatus for use in telecommunications including: a first ear-insertion body serving as an earphone; and a second ear-insertion body provided separately from the first ear-insertion body and serving as a microphone of a bone-conduction type.

With the aforesaid construction, the transmitting/receiving apparatus drives the earphone by sending a receiving signal to the first ear-insertion body and transmits a transmitting signal from the microphone of the second ear-insertion body via a wire or over wireless utilizing a radio wave or ultrasonic wave. The microphone of the second ear-insertion body receives a voice signal from the user's external auditory meatus through bone conduction, and assuredly catches even a faint voice as a voice signal. The second ear-insertion body is provided separately from the first ear-insertion body and, therefore, such problems as howling and crosstalk between the microphone and the earphone can be avoided. Further, the transmitting/receiving apparatus of the present invention frees the user's hands.

These and other objects, features and attendant advantages will become apparent from the following detailed description.

DETAILED DESCRIPTION OF THE PREFERRED EMBODIMENTS

With reference to the attached drawings, the present invention will hereinafter be described in detail by way of embodiments thereof.

Figure 1:
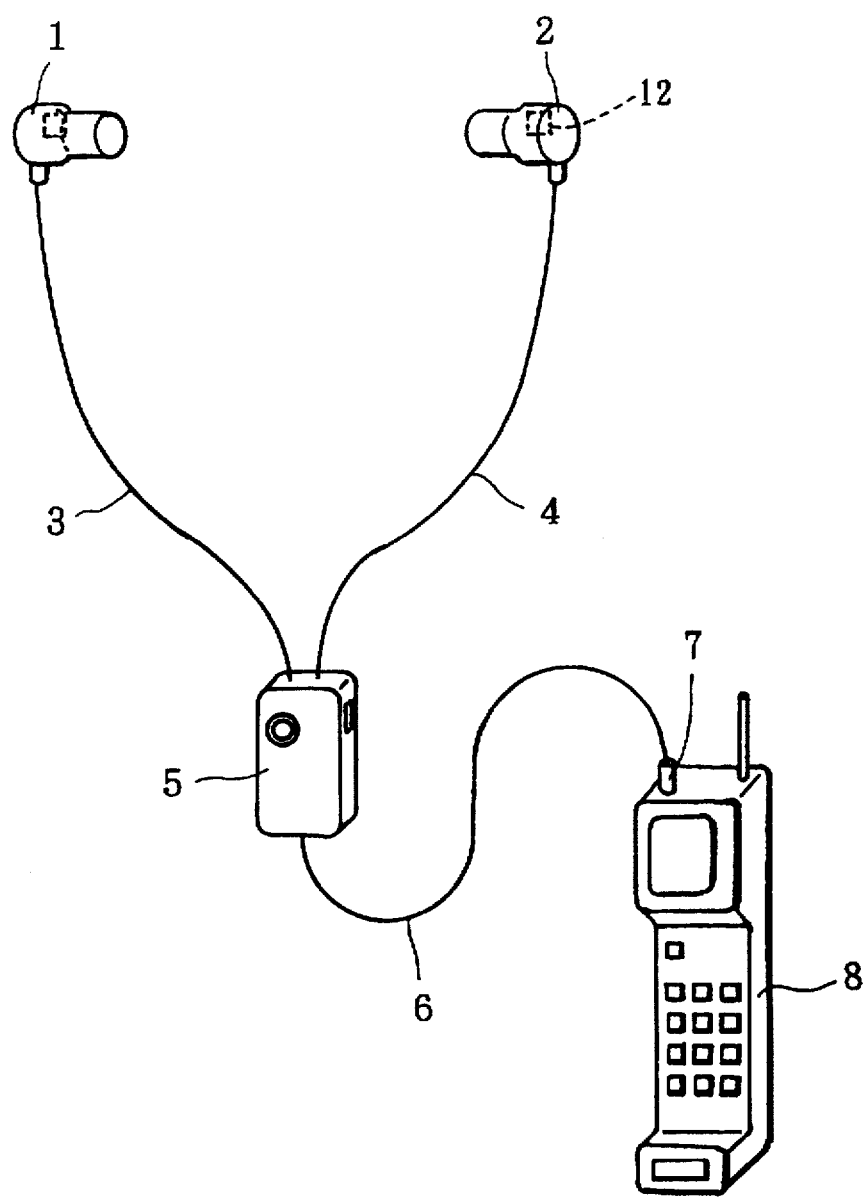
FIG. 1 is a perspective view illustrating the appearance of a transmitting/receiving apparatus for use in telecommunications in accordance with one embodiment of the present invention.

Referring to FIG. 1, a transmitting/receiving apparatus includes a first ear-insertion body 1 having an electric/vibration conversion element (not shown) incorporated therein to serve as an earphone, and a second ear-insertion body 2 serving as a bone-conduction microphone. The first and second ear-insertion bodies 1 and 2 are connected to an adjustor 5 via wires 3 and 4. The adjustor 5 is connected to a handy phone 8 with a plug 7 of the wire 6 being inserted into a jack of the handy phone 8. The adjustor 5 has an amplifier, equalizer, volume adjustor and the like incorporated therein.

Figure 2:
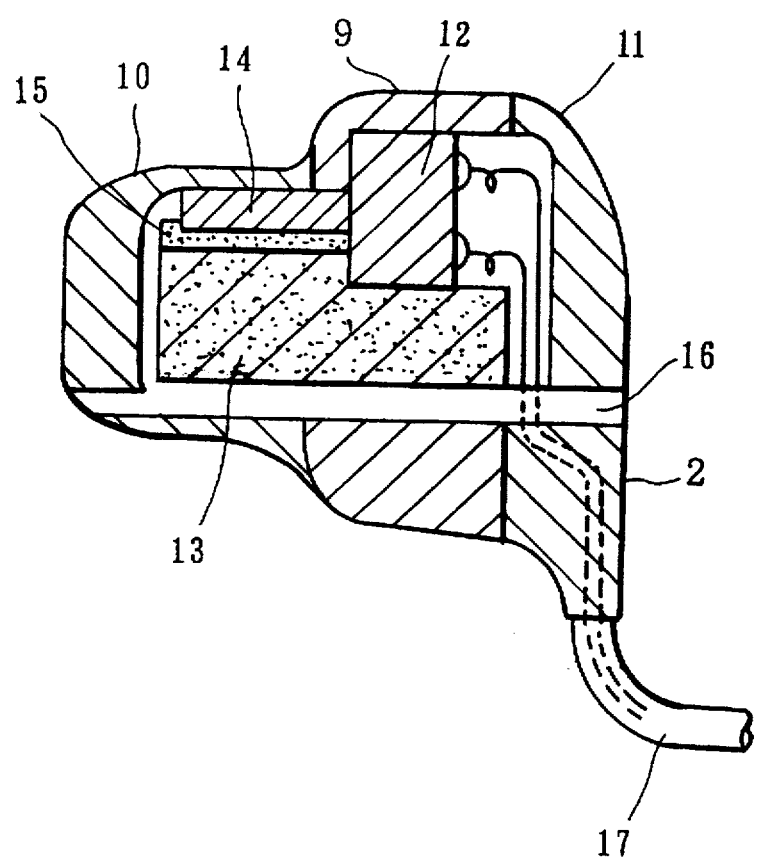
FIG. 2 is a sectional view illustrating a second ear-insertion body of the transmitting/receiving apparatus which serves as a microphone.

The second ear-insertion body 2 serving as a bone-conduction microphone has a structure as shown in FIG. 2. Specifically, the second ear-insertion body 2 includes a body casing 9 formed of a synthetic resin, an insertion cover 10 provided at the front end of the body casing 9 and formed of a relatively rigid resin selected from silicone resins or polyvinylchloride resins into a configuration such that the outer periphery thereof contacts an external auditory meatus of a user's ear, a rear end cover 11 provided at the rear end of the body casing 9, and a vibration sensor 12 supported by a support member 13 in the body casing 9. A vibration bar 14 serving as a vibration conduction member and connected to a vibration element of the vibration sensor 12 extends to the front end of the body casing 9 and connected to the interior surface of a side portion of the insertion cover 10. A soft silicone rubber 15 which does not hinder the vibration of the vibration bar 14 is provided around the vibration bar 14. The second ear-insertion body 2 has a vent hole 16 extending through a rear cover 11, support member 13 and insertion cover 10. A wire 17 is connected to a terminal of the vibration sensor 12.

Figure 3:
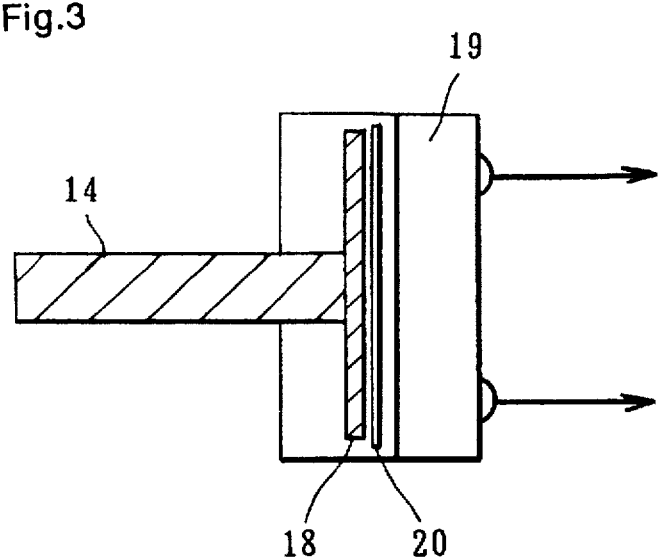
FIG. 3 is an electrical circuit diagram of the second ear-insertion body.

The vibration sensor 12 comprises a capacitor microphone as shown in FIG. 3. More specifically, the vibration sensor 12 includes a vibration electrode 18, a solid electrode 19 and a dielectric 20 interposed therebetween, and the vibration bar 14 is connected to the vibration electrode 18.

In this embodiment, the vibration bar 14 has a diameter of 1.6 mm and a length of 10 mm and is formed of a metal such as stainless steel or iron, which has a specific gravity of about 5 kg/m$^3$ to about 20 kg/m$^3$.

In use, the first ear-insertion body 1 serving as a ear-phone is inserted into one ear, and the second ear-insertion body 2 serving as a bone-conductive microphone is inserted into the other ear. The first ear-insertion body 1 receives a transmitted electric signal and converts it into audio vibration thereby serving as an earphone. In the second ear-insertion body 2, a voice uttered is transferred by bone conduction to the vibration bar 14 via the insertion cover 10 contacting the user's external auditory meatus. The vibration electrode 18 is vibrated by the vibration of the vibration bar 14; and the voice is converted into audio/electric signals based on the capacity variation of a capacitor incorporated in the second ear-insertion body 2. The signals thus generated are transmitted from the second ear-insertion body 2.

Thus, the transmitting/receiving apparatus of the present invention achieves the transmission and reception of audio information. Since the first ear-insertion body 1 serving as an earphone and the second ear-insertion body 2 serving as a microphone are both inserted in the user's ears, the user can freely use his hands to perform other manual operations. Further, the first ear-insertion body 1 serving as an earphone and the second ear-insertion body 2 serving as a microphone are separately provided and, therefore, the howling and cross-talk will never occur. Further, since the first ear-insertion body 1 incorporating the microphone is inserted into one ear, the first ear-insertion body 1 does not pick up any external noise. Particularly, the capacitor microphone has a sensitivity higher than that of a conventional acceleration sensor, thereby being capable of reproducing a voice close to an original voice. Thus, an excellent voice reproduction characteristic of the capacitor microphone allows the second ear-insertion body 2 to transmit a clear voice signal.

The insertion cover 10 of the second ear-insertion body 2 is formed of a rigid resin, and the vibration bar 14 connected thereto is made of a metal having a specific gravity of about 5 kg/m$^3$ to about 20 kg/m$^3$. Therefore, even a faint voice is efficiently conveyed as a vibration through the user's external auditory meatus. Thus, the second ear-insertion body 2 serves as an effective bone-conduction microphone.

Further, there is no need to attach the microphone to the user's throat as in the prior art, because the second ear-insertion body 2 serving as a microphone provided separately from the earphone is inserted into the user's ear. Therefore, the user feels neither pressure on the throat and nor inconvenience in uttering a voice. Furthermore, any supporter member is not required.

Figure 4:
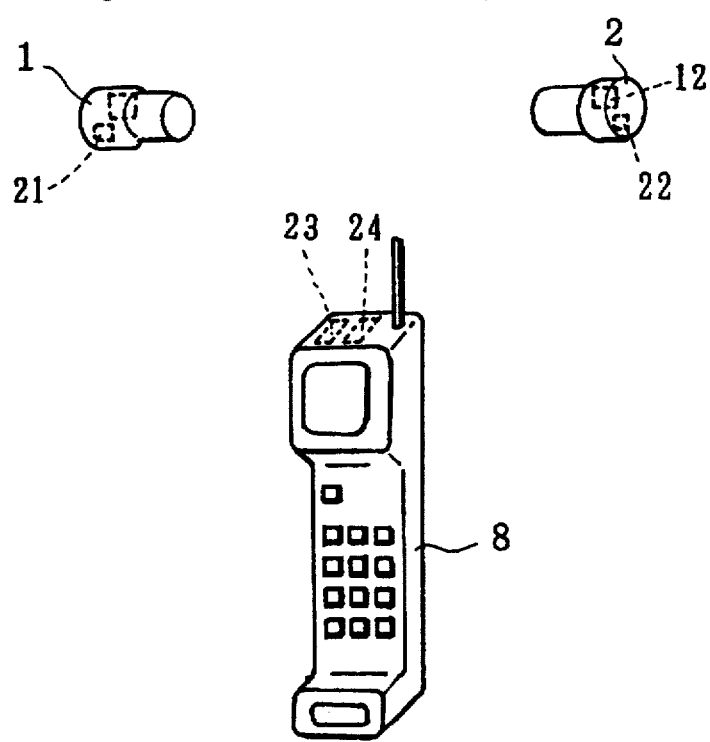
FIG. 4 is a perspective view illustrating the appearance of a transmitting/receiving apparatus for use in telecommunications in accordance with another embodiment of the present invention.

FIG. 4 shows a transmitting/receiving apparatus for use in telecommunications in accordance with a second embodiment of the present invention. This transmitting/receiving apparatus is characterized by its cordless configuration which is embodied without the need to provide a wire as provided in the aforesaid first embodiment.

As shown, a first ear-insertion body 1 has a first receiver 21 disposed therein and connected to an audio conversion element. A second ear-insertion body 2 has a first transmitter 22 disposed therein and connected to a microphone element. A handy phone has a second transmitter 23 for transmitting to the first receiver 21 and a second receiver 24 for receiving from the first transmitter 22. The output of a radio signal herein employed is weak such that the radio wave reaches within several meters.

Figure 5:
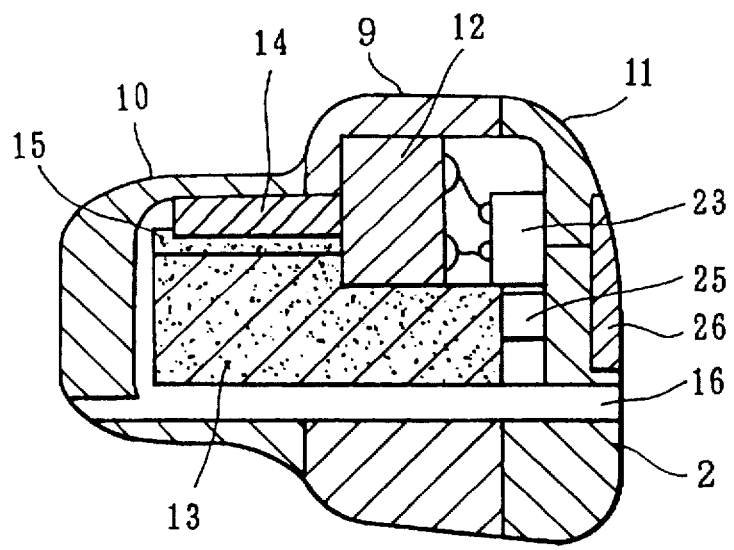
FIG. 5 is a sectional view illustrating a second ear-insertion body of the transmitting/receiving apparatus shown in FIG. 4 which serves as a microphone.
Figure 6:
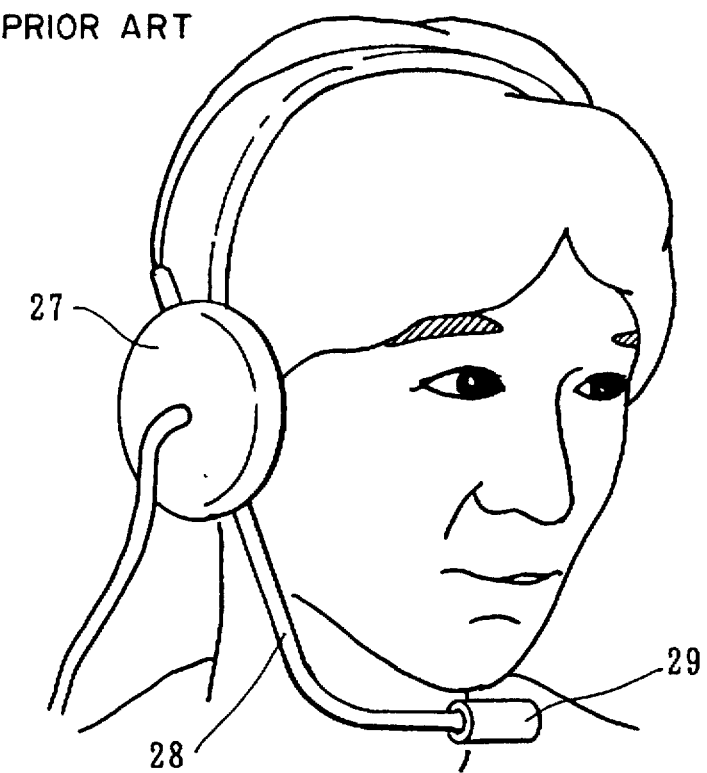
FIG. 6 is a perspective view illustrating a conventional transmitting/receiving apparatus for use in telecommunications.
Figure 7:
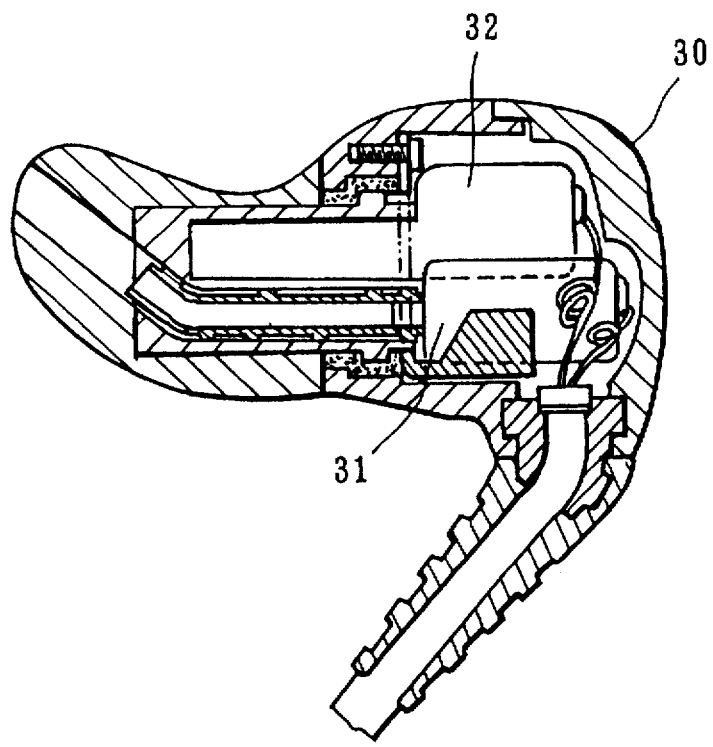
FIG. 7 is a sectional view illustrating another conventional transmitting/receiving apparatus.
Figure 8:
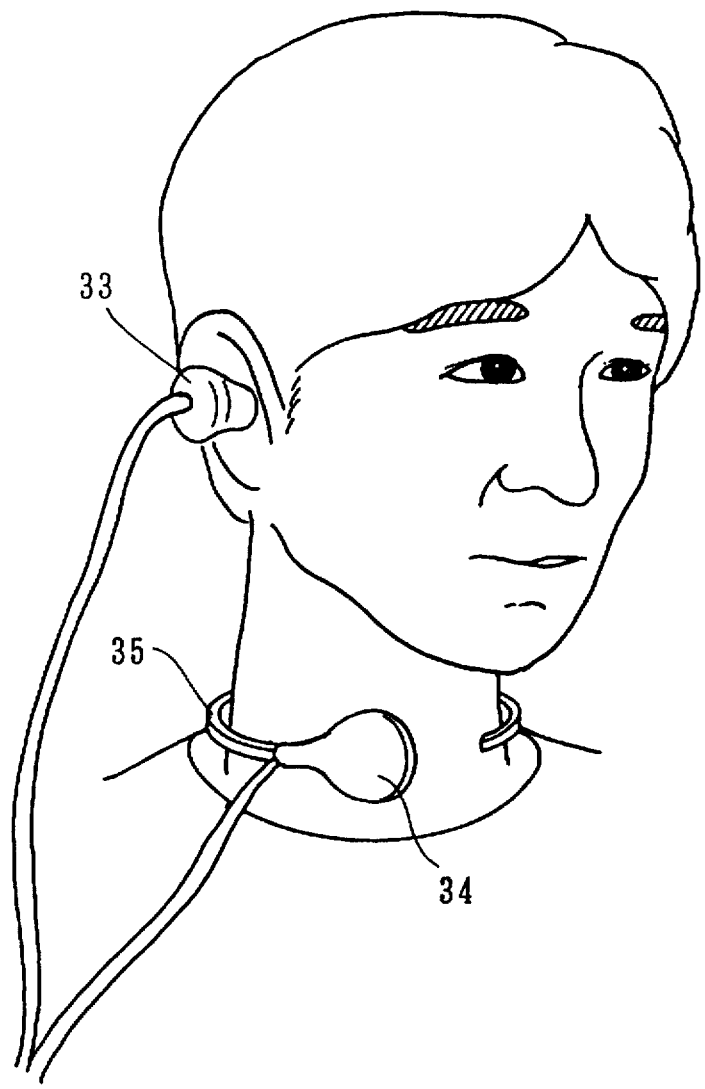
FIG. 8 is a perspective view illustrating still another conventional transmitting/receiving apparatus.

FIG. 5 is a sectional view illustrating one example of the second ear-insertion body 2 serving as a microphone. As shown, the second ear-insertion body 2 has the second transmitter 23 connected to a vibration sensor within a rear cover 11, a battery 25 for driving the apparatus, and an antenna chip 26 made of a metal and exposed on an outer surface of the rear cover 11. Since the transmitting/receiving apparatus of the second embodiment is of the so-called cordless type, a user can conveniently use the transmitting/receiving apparatus without being disturbed by the wire.

Although the transmitting/receiving apparatus according to the foregoing embodiments are designed to be used with a handy phone, they can be effectively used with an ordinary stationary telephone or a transceiver. In addition, it is possible to use ultrasonic waves instead of radio waves as transmitting medium, without causing any disadvantage.

As can be understood from the foregoing, the first ear-insertion body serving as an earphone and the second ear-insertion body serving as a microphone are separately provided in the transmitting/receiving apparatus in accordance with the present invention, and the microphone is of a bone-conduction type. Therefore, the transmitting/receiving apparatus frees user's hands, and does not cause such problems as howling and crosstalk. In addition, the user can comfortably use the receiving/transmitting apparatus without feeling pressure on the throat.

The second ear-insertion body serving as a microphone has the insertion cover formed of a rigid material and the vibration bar connected thereto and formed of a metal having a high specific gravity. Therefore, the second ear-insertion body can efficiently receive bone vibration conveyed through the user's external auditory meatus. Further, the second ear-insertion body incorporating the capacitor microphone as the vibration sensor has excellent frequency characteristics, thereby permitting clear voice to be received and transmitted. Thus, the transmitting/receiving apparatus of the present invention offers great practical advantages.

While only certain presently preferred embodiments of the invention have been described in detail, as will be apparent with those familiar with the art, certain changes and modifications can be made in embodiments without departing from the spirit and scope of the invention as defined by the following claims.

What is claimed is:

1. A transmitting/receiving apparatus for use in telecommunications, comprising:

a first ear-insertion body serving as an earphone for insertion into one ear of a user; and a second ear-insertion body provided separately from the first ear-insertion body for insertion into the other ear of the user;

the second ear-insertion body comprising a body casing incorporating therein a capacitor microphone having a vibration electrode, an insertion cover adjoining with the body casing and having a configuration such that the outer periphery of the insertion cover contacts a user's external auditory meatus, and a vibration conduction member connected to a central portion of the vibration electrode at one end thereof and connected to the insertion cover at the other end thereof.

2. A transmitting/receiving apparatus as set forth in claim 1, wherein the insertion cover is formed of a rigid resin, and the vibration conduction member is formed of a metal having a specific gravity of about 5 kg/m$^3$ to about 20 kg/m$^3$.

3. A transmitting/receiving apparatus as set forth in claim 1, wherein the first ear-insertion body has a receiver adapted to receive a radio wave signal or an ultrasonic wave signal, while the second ear-insertion body has a transmitter adapted to transmit a radio wave signal or an ultrasonic wave signal.

* * * * *